(12) United States Patent
Carbune et al.

(10) Patent No.: US 12,499,886 B2
(45) Date of Patent: *Dec. 16, 2025

(54) DOCUMENT CREATION AND EDITING VIA AUTOMATED ASSISTANT INTERACTIONS

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/974,415

(22) Filed: Oct. 26, 2022

(65) Prior Publication Data

US 2023/0049562 A1 Feb. 16, 2023

Related U.S. Application Data

(63) Continuation of application No. 16/948,186, filed on Sep. 8, 2020, now Pat. No. 11,488,597.

(51) Int. Cl.
   *G10L 15/22* (2006.01)
   *G06F 3/16* (2006.01)
   (Continued)

(52) U.S. Cl.
   CPC .............. *G10L 15/22* (2013.01); *G06F 3/167* (2013.01); *G10L 13/02* (2013.01); *G10L 15/063* (2013.01);
   (Continued)

(58) Field of Classification Search
   CPC ....... G10L 15/22; G10L 13/02; G10L 15/063; G10L 15/1815; G10L 25/54; G10L 2015/223; G06F 3/167; G06F 40/30
   See application file for complete search history.

(56) References Cited

U.S. PATENT DOCUMENTS

2003/0167167 A1* 9/2003 Gong ...................... G10L 15/22
                                                        704/250
2008/0004880 A1    1/2008 Acero et al.
(Continued)

OTHER PUBLICATIONS

European Patent Office; International Search Report and Written Opinion of PCT Ser. No. PCT/US2020/064948; 10 pages; dated May 27, 2021.

(Continued)

*Primary Examiner* — Athar N Pasha
(74) *Attorney, Agent, or Firm* — Gray Ice Higdon

(57) ABSTRACT

Implementations set forth herein relate to an automated assistant that allows a user to create, edit, and/or share documents without directly interfacing with a document editing application. The user can provide an input to the automated assistant in order to cause the automated assistant to interface with the document editing application and create a document. In order to identify a particular action to perform with respect to a document, and/or identify a particular subsection within the document to direct the action, the automated assistant can rely on semantic annotations. As a user continues to interact with the automated assistant to edit a document, the semantic annotations can be updated according to how the document is changing and/or how the user refers to the document. This can allow the automated assistant to more readily fulfill document-related requests that may lack express details.

18 Claims, 10 Drawing Sheets

(51) Int. Cl.
  *G10L 13/02* (2013.01)
  *G10L 15/06* (2013.01)
  *G10L 15/18* (2013.01)
  *G10L 25/54* (2013.01)
(52) U.S. Cl.
  CPC .......... *G10L 15/1815* (2013.01); *G10L 25/54* (2013.01); *G10L 2015/223* (2013.01)

(56) References Cited

U.S. PATENT DOCUMENTS

| | | |
|---|---|---|
| 2008/0126941 A1 | 5/2008 | Sharma |
| 2010/0153318 A1 | 6/2010 | Branavan et al. |
| 2011/0040766 A1 | 2/2011 | Robinson |
| 2011/0314375 A1* | 12/2011 | Zaika .................. G06Q 30/0241 715/708 |
| 2013/0179830 A1* | 7/2013 | Lee ................... H04M 1/72469 715/784 |
| 2014/0218372 A1* | 8/2014 | Missig ................ G06F 3/04883 345/173 |
| 2016/0117146 A1* | 4/2016 | Raux ....................... G06F 3/167 715/716 |
| 2017/0046320 A1* | 2/2017 | Reicher ................. G06F 40/166 |
| 2017/0132194 A1* | 5/2017 | Lee ......................... G06F 40/18 |
| 2017/0358305 A1* | 12/2017 | Kudurshian ............ G10L 15/22 |
| 2019/0012198 A1 | 1/2019 | Ni et al. |
| 2019/0074006 A1 | 3/2019 | Kumar et al. |
| 2019/0108274 A1* | 4/2019 | DaBoll-Lavoie ... G06F 16/3338 |
| 2019/0243669 A1* | 8/2019 | Gupta ..................... G10L 15/26 |
| 2020/0159838 A1 | 5/2020 | Kikin-Gil et al. |
| 2020/0184156 A1 | 6/2020 | Badr et al. |
| 2020/0388276 A1 | 12/2020 | Kunnath et al. |
| 2021/0056967 A1 | 2/2021 | Jang et al. |
| 2021/0124555 A1 | 4/2021 | Davlos et al. |
| 2021/0173865 A1 | 6/2021 | Bandhu et al. |
| 2022/0076668 A1 | 3/2022 | Carbune et al. |
| 2023/0074681 A1* | 3/2023 | Wang .................. G10L 15/1815 |

OTHER PUBLICATIONS

Intellectual Property India; Examination Report issued in Application No. 202227064277; 6 pages; dated Aug. 24, 2023.

China National Intellectual Property Administration; Notification of First Office Action issued in Application No. 202080101564.8; 41 pages; dated Jul. 31, 2024.

European Patent Office; Communication pursuant to Article 94(3) EPC issued in Application No. 20839476.7, 7 pages; dated Apr. 4, 2025.

China National Intellectual Property Administration; Notification of Second Office Action issued in Application No. 202080101564.8; 4 pages; dated Jan. 10, 2025.

China National Intellectual Property Administration; Notice of Allowance issued in Application No. 202080101564.8; 4 pages; dated Jul. 8, 2025.

\* cited by examiner

DOCUMENT CREATION AND EDITING VIA AUTOMATED ASSISTANT INTERACTIONS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant can be employed to perform discrete actions such as opening a music application, adjusting settings of smart home devices, as well as many other tasks. However, editing of content-rich documents (e.g., an article to be published) has typically remained reserved for desktop environments that have a dedicated monitor, as well as common peripherals such as a keyboard and a mouse. Although many tablet-style devices have enabled other means for editing documents, such as via a touch screen interface, a user may be required to dedicate their full dexterity to each editing session in order to edit a content-rich document. For instance, adding a paragraph of text to a particular document stored on a cloud drive may necessitate that a user: access the particular document via a foreground application of a tablet device, scroll to the particular paragraph to be edited, and manually type to edit the paragraph. This can require a large quantity of user inputs and significant usage of client device resources to process the inputs, to render the particular document for a prolonged duration, etc. Additionally, any other tasks being performed via the tablet device may be delayed because the user would be unable to engage with any other application during this time.

Furthermore, various document editing applications that exist as cloud applications may allow for multiple different users to simultaneously edit a document through a desktop-style interface. Such applications can allow for multiple reviewers to simultaneously examine a document via the desktop-style interface. However, a period of review may be unduly delayed as long as editing and commenting are restricted to certain application interfaces. For example, one reviewer may get an email notification on their phone that another user has added a comment to a document. Unfortunately, the user may not be able to completely address the comment until the user has access to a desktop computer or other device with a suitable graphical user interface. Moreover, and as a result, the user may not be apprised of any substance of the comment, and therefore would not be able to prepare to respond to the comment in advance of accessing the comment. These limitations can result in various users checking for document review updates from interfaces that may not enable editing functionality. This can result in unnecessary consumption of computational resources such as power and processing bandwidth.

SUMMARY

Implementations set forth herein relate to an automated assistant that can operate as a modality for completing various document-related actions for content-rich documents. A content-rich document can refer to any set of data incorporated into a single document. The set of data can include, but is not limited to, multiple different sections, topics, subtopics, styles, cells in a spreadsheet, slides in a presentation, graphics, and/or any combination of features that can be incorporated into a document. The automated assistant can operate to allow a user to edit, comment, and/or share an existing document, or create a new document, through one or more interactions between the automated assistant and the user. In other words, a user does not necessarily need to be viewing a document editing program in a foreground of a graphical user interface (GUI) in order to perform such operations. Rather, the automated assistant can, for instance, allow the user to perform various document-related tasks through verbal interactions and/or any other type of interactions—optionally without the user viewing the document when providing the verbal interactions. Such document-related tasks can be accomplished by allowing the automated assistant to generate semantic annotations of various portions of individual documents that a user may request the automated assistant to access and/or modify. For example, the document-related task to be performed can be determined based on processing at least part of spoken utterance of a user in view of semantic annotation(s) of the document (e.g., to determine to which portion of the document the document-related task should be performed). Referencing semantic annotations in this way can streamline document creation and/or document review, which might otherwise necessitate prolonged graphical rendering of the document and/or direct user interaction with, for example, a document editing application that is accessible via a desktop computing device. Furthermore, when document-reviewing users are able to quickly review content-rich documents through any device that provides access to an automated assistant, review times of documents and power consumption of devices can be reduced. Such devices can include, but are not limited to, watches, cellular phones, tablet computers, home assistant devices, and/or any other computing device that can provide access to an automated assistant.

As an example, a user can be a researcher who is working with a group of researchers to review an electronic document that is to be submitted for publication. During the review process, each researcher may be traveling according to schedules that do not allow for much downtime to sit in front of a computing device to review edits and/or comments in the document. In order to make edits and/or review comments to the document, a user can rely on an automated assistant, which can be accessible via an "ecosystem" of user devices. For example, as the document is being reviewed by the researchers, a document application that provides access to the document can send to, and receive from, the automated assistant, certain data associated with the document.

In some instances, the document can be a spreadsheet and a particular edit to the document can be effectuated when the user provides a spoken utterance such as, "Assistant, add a column to my latest 'research' document and add a comment saying 'Could someone add this month's data to this column?'" The user can provide this spoken utterance to an interface of their watch, which can provide access to the automated assistant but may not include a native document editing application for editing the spreadsheet. In response to receiving the spoken utterance, the automated assistant can process audio data corresponding to the spoken utterance and determine one or more actions to perform.

Processing of the audio data can involve utilizing one or more trained machine learning models, heuristic processes, semantic analyses, and/or any other processes that can be employed when processing a spoken utterance from a user.

As a result of the processing, the automated assistant can initialize performance of one or more actions specified by the user via the spoken utterance. In some implementations, the automated assistant can use an application programming interface (API) in order to cause a particular document application to perform the one or more actions. For instance, in response to the aforementioned spoken utterance, the automated assistant that is accessible via the watch of the user can generate one or more functions to be executed in response to the spoken utterance from the user. For example, the automated assistant can cause one or more functions to be performed in order to determine where in the particular document that an additional column should be added. A function for determining where to place the additional column can be total_columns(most_recent ('research')), which can identify a total number of non-blank columns that are included in a most recently accessed document that has a semantic annotation with the term "research." In some implementations, the "total_columns" function can be identified based on one or more prior interactions between the user and a document editing application and/or the automated assistant. Alternatively, or additionally, the "total_columns" function can be identified using one or more trained machine learning models, which can be used to rank and/or score one or more functions to be executed in order to identify additional information for use when responding to the user.

For example, the total_columns(most_recent('research')) function can return a value of "16," which can be used by the automated assistant to generate another function to be executed for adding a column (e.g., "16+1") to the particular document. For instance, the automated assistant can initialize execution of functions such as: action:new_column((16+1), most_recent('research')) and an action:comment(column (16+1), "Could someone add this month's data to this column?", most_recent('research')). In this instance, the command "most_recent('research')," when executed, can result in identification of one or more documents that have been most recently accessed by the user and that include a semantic annotation with the term "research." When the function most_recent('research') results in a particular document that the user is referring to, the "new_column" and "comment" functions can be executed in order to edit the particular document in accordance with the spoken utterance from the user.

Execution of the aforementioned functions can cause other instances of the automated assistant to notify each researcher, and/or each user with permission to view the spreadsheet, of the changes to the spreadsheet. For example, another user can receive a notification from an automated assistant indicating that the user edited the spreadsheet and incorporated a comment (e.g., in some instances the user can edit via desktop computer GUI without necessarily invoking the automated assistant). The automated assistant can generate the notification by comparing a previous version of the spreadsheet to a current version of the spreadsheet (e.g., using an API call to the document application), and/or by processing the spoken utterance from the user. The automated assistant can audibly provide the notification via a push notification that is rendered in a foreground of a GUI of a cellular phone. The push notification can include content such as, "The spreadsheet has been edited by Mary to include a new column and a new comment." In response to receiving the notification, the other user can view the new column in the spreadsheet via their cellular phone. Alternatively, or additionally, the other user can also edit the spreadsheet via their automated assistant by providing another spoken utterance—without necessarily opening the particular document application in a foreground of the GUI of the cellular phone.

As an example, based on the push notification provided via the automated assistant, the other user can provide an additional spoken utterance such as, "Assistant, what does the new comment say?" However, because the other user may not have explicitly identified the document to be accessed, the automated assistant can deduce the identity of the document based on various semantic annotations and/or other contextual data. For example, the automated assistant can identify one or more documents that have been recently accessed and/or modified by the other user and determine whether any of the recently accessed documents have characteristics described in the spoken utterance. For instance, each document of the one or more documents can include semantic annotations that characterize subsections of a respective document. Based on this analysis, the automated assistant can identify the spreadsheet as being subject to this additional spoken utterance because the spreadsheet includes a recently added comment (i.e., a "new comment"). Furthermore, and based on the additional spoken utterance, the automated assistant can access content of the recently added comment and audibly render the content of the added comment for the other user, without graphically rendering the entire (or any of the) spreadsheet (e.g., "Mary's new comment recites: 'Could someone add this month's data to this column?'").

In some implementations, the other user can supplement the spreadsheet with data from a separate document using the automated assistant—and without directly interacting with an interface of the document editing application. For example, as part of a backend process, and with prior permission from the other user, the automated assistant can analyze documents that are stored in association with the other user (e.g., in association with an account of the user, such as one utilized by the automated assistant or linked with the user's automated assistant account) in order for the automated assistant to have a semantic understanding of those documents. This semantic understanding can be embodied in semantic annotations, which can be stored as metadata in association with each document. In this way, users will be able to edit and review documents via their automated assistant using assistant commands that are directed to a semantic understanding of a document, rather than an explicit recitation of a portion of a document.

As an example, and based on the automated assistant audibly rendering the added comment, the other user can provide a spoken utterance to their cellular phone in order to cause the automated assistant to edit the spreadsheet using data from a separate document. The spoken utterance can be, "Assistant, please fill in that column using data from this month's sensor data spreadsheet." In response to the spoken utterance, the automated assistant and/or other associated application can process the spoken utterance and/or one or more documents in order to identify one or more actions to be performed. For instance, the automated assistant can use one or more trained machine learning models to determine actions that are synonymous with the verb "fill." As a result, the automated assistant can identify an "insert( )" function of the document application. In some implementations, in order to identify the data within the document that the other user is referring to, the automated assistant can identify a list of recently created documents, and filter out any documents that were not created "this month." As a result, the automated assistant can be left with a reduced list of documents that the automated assistant can select for being subjected to the "insert( )" function.

In some implementations, although the other user provided a descriptor for the source document (e.g., "this month's 'sensor data' spreadsheet") but not the actual name (e.g., "August TL-9000"), the automated assistant can still identify the correct source document from the reduced list of "this month's" documents. For example, the automated assistant can employ one or more heuristic processes and/or one or more trained machine learning models in order to identify the source document and/or data within the source document to "fill" into the spreadsheet according to the comment. In some implementations, semantic annotation data may already be stored in association with the source document and can indicate that a device identifier "TL-9000" that is listed as a name for a column in the source document is synonymous with a type of temperature "sensor." This information regarding the temperature sensor can be described in search results from an internet search, or other knowledge base lookup, performed by the automated assistant using document data (e.g., a document title "August TL-9000"), thereby providing a correspondence between the column name and the request for the automated assistant to use "sensor data."

When the automated assistant has identified the particular source document and column of data that the other user is referring to in the spoken utterance, the automated assistant can execute the "insert( )" function using the column of data. For example, the automated assistant can generate a command such as "insert(column("August_TL-9000", 11), column("Research_Document", 17), wherein "11" refers to the column of the sensor data spreadsheet that includes "this month's" data, and wherein "17" refers to the "new" column previously added by the user.

In some implementations, instances of document-related data can be shared among instances of automated assistants in order for each instance of the automated assistant to more accurately edit documents according to user instructions. For instance, because the user initially caused their automated assistant to add a new column, which was identified as column "17," the identifier "17" for the "new column" can be shared with another instance of the automated assistant being invoked by the other user. Alternatively, or additionally, data characterizing user-assistant interactions can be stored in association with a document and/or a portion of a document in order for each instance of the automated assistant to more accurately execute user instructions. For example, a semantic annotation stored in association with the spreadsheet can characterize column "17" as "this month's data per Mary." In this way, any other instance of the automated assistant that receives a command associated with "Mary" or "this month's data" can refer to column "17" because of the correlation between the command and the semantic annotation associated with column "17." This allows for the automated assistant to more effectively execute automated assistant requests for certain documents as users continue to interact with the automated assistant to edit those certain documents.

When the automated assistant has caused the "insert( )" function to be executed, and the spreadsheet is modified to include the additional "sensor" data, the automated assistant can generate a notification to be pushed to each researcher. In some implementations, a push notification generated based on the modification can characterize the edit made by the other user via the automated assistant. For example, the push notification can be rendered for the other researchers as a GUI element, such as a callout bubble with a graphical rendering of a portion of the spreadsheet modified by the other user. The GUI element can be generated by the automated assistant using an API, or other interface associated with the document application, in order to generate graphical data characterizing a portion of the spreadsheet where the other user made the modification.

In some implementations, the automated assistant can fluidly transition between dictation and command interpretation as the other user is speaking to the automated assistant. For example, instead of causing the automated assistant to copy data from the separate document to the spreadsheet, the user other user can speak a combination of (i) instructions to be performed and (ii) text to be incorporated into the spreadsheet. For instance, the other user can be referencing a printed set of data and provide a spoken utterance such as, "Assistant, in the new column of the research document, add '39 degrees' to the first cell, '42 degrees' to the second cell, and '40 degrees' to the third cell." In response to this spoken utterance from the other user, the automated assistant can identify the spreadsheet that was recently modified to include a new column, and select one or more cells in the new column. The automated assistant can determine that the spoken utterance from the other user included some amount of dictation and select portions of textual data that was transcribed from the spoken utterance to be incorporated into certain cells. Alternatively, or additionally, a format of each cell in the new column can be modified to correspond to "degree" values, in order that the new column will reflect units (e.g., degrees in Celsius) of the data to be added to the new column, and as specified in the spoken utterance. The automated assistant can input each numerical value according to the spoken utterance, at least based on text to speech processing and natural language understanding of the entire spoken utterance. In some implementations, the spoken utterance can be fulfilled without the other user accessing the document application that provides access to a GUI for editing the spreadsheet but, rather, can perform these modifications through verbal interactions with the automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
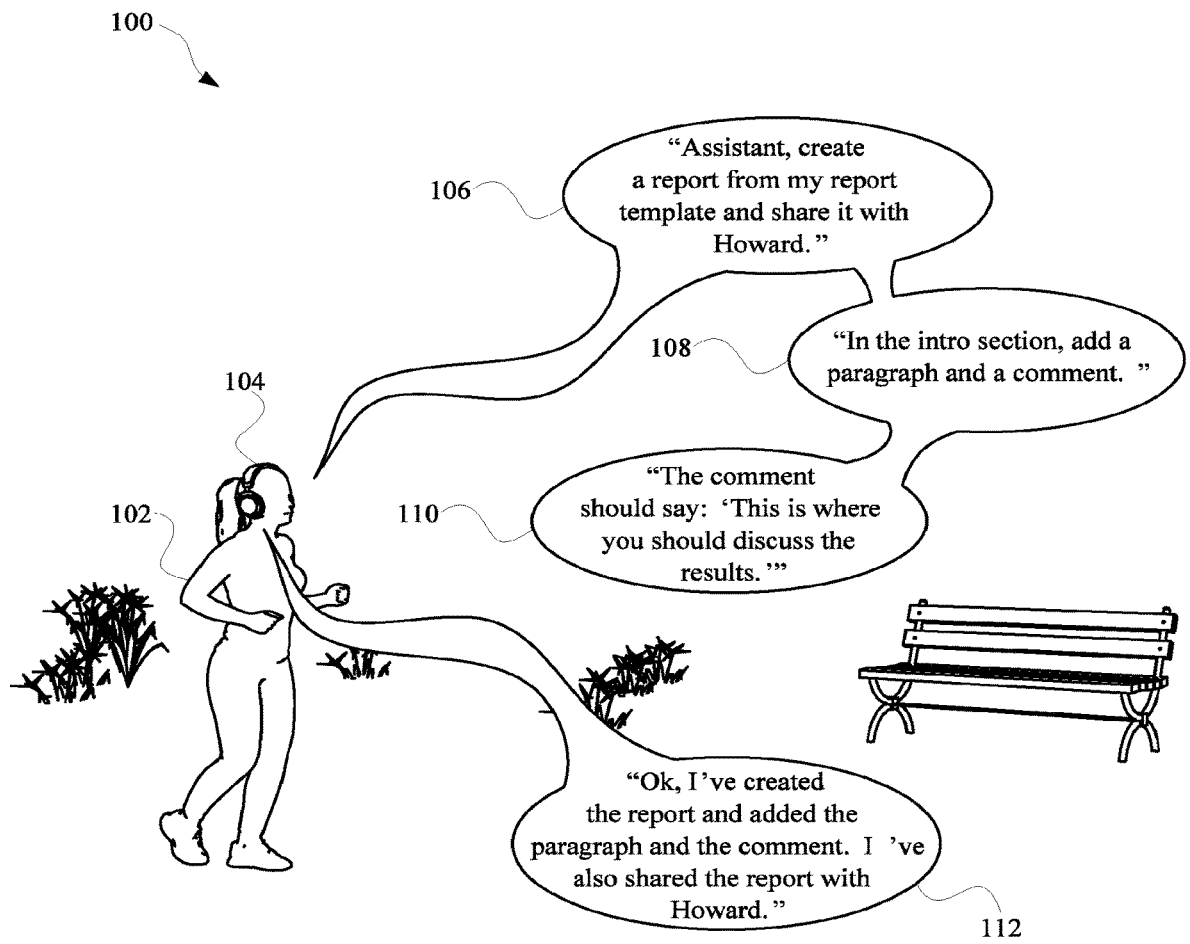
FIG. 1A, FIG. 1B, and FIG. 1C illustrate views of one or more users interacting with an automated assistant in order to create and edit a document without necessarily directly editing the document via a GUI interface.
Figure 1B:
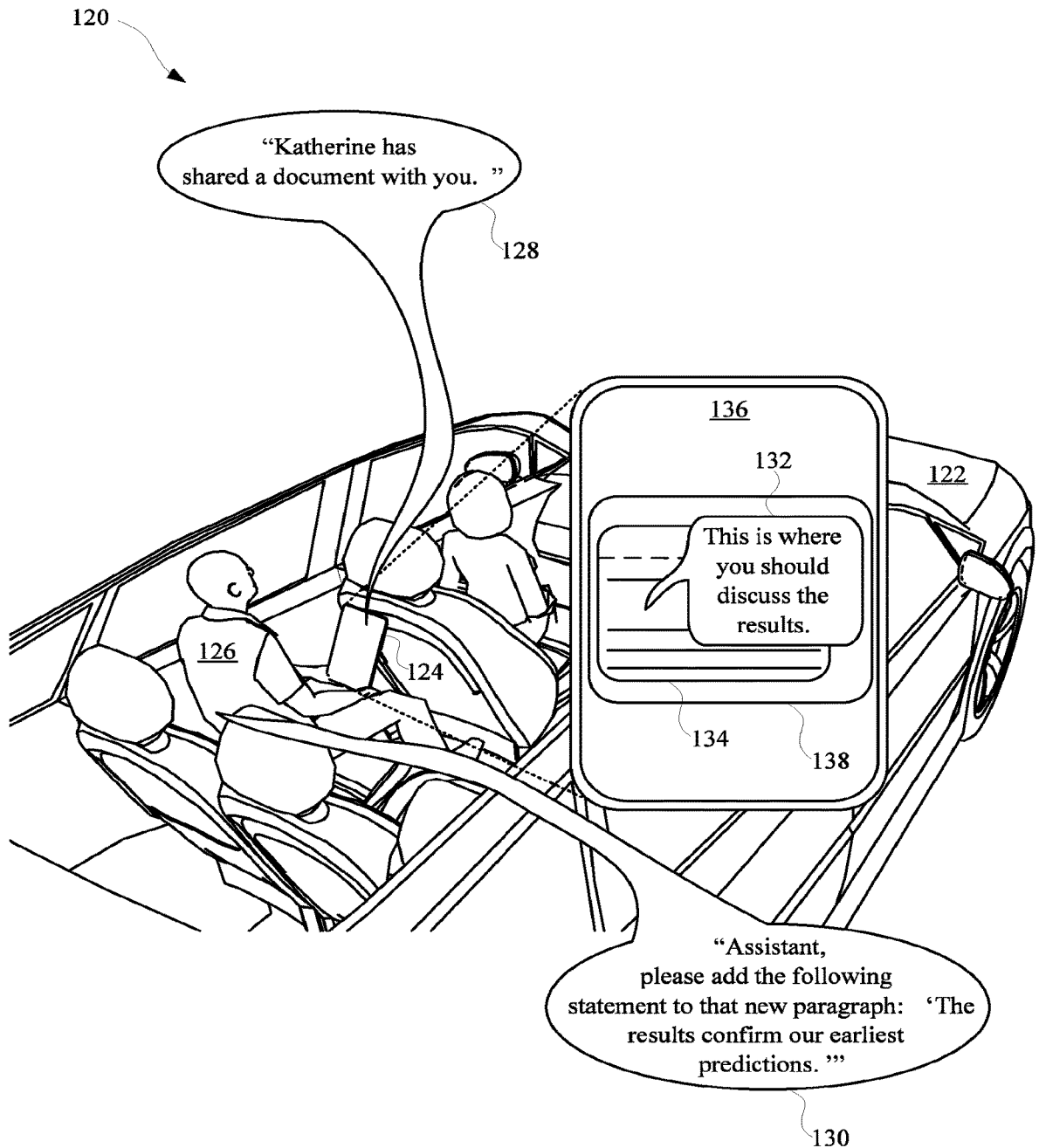
Figure 1C:
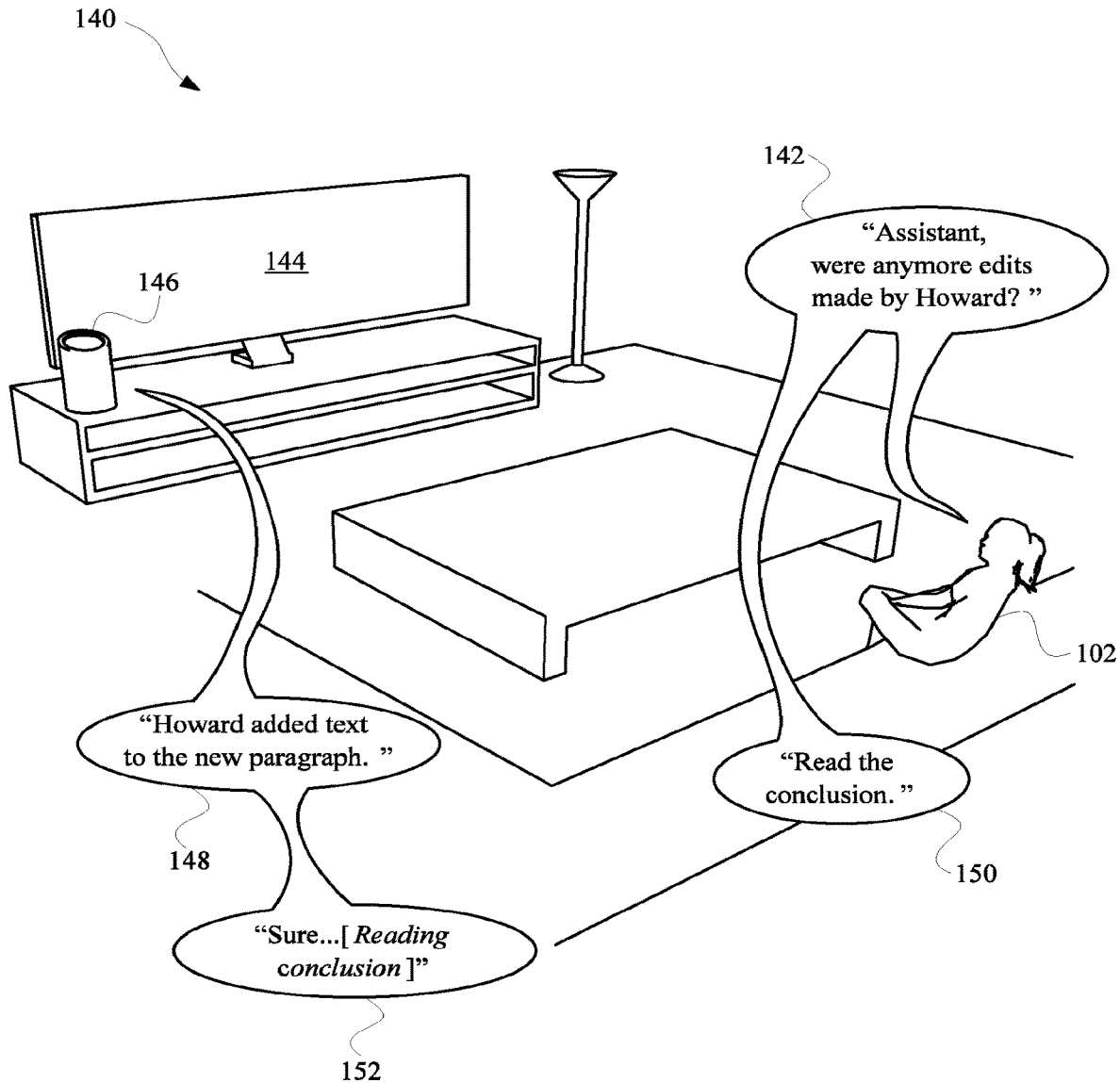

FIG. 1A, FIG. 1B, and FIG. 1C illustrate a view 100, a view 120, and a view 140 of one or more users interacting with an automated assistant in order to create and edit a document without necessarily directly editing the document via a GUI interface. In this way, users would not be limited to display interfaces when creating and editing documents but, rather, can rely on an automated assistant that can be accessed from a variety of different interfaces. For example, and as illustrated in FIG. 1A, a first user 102 can be jogging outside when they happen to have an idea regarding a particular report they would like to have generated. The first user 102 can request that the automated assistant create the report by providing a first spoken utterance 106 such as, "Assistant, create a report from my report template and share it with Howard." The first spoken utterance 106 can be received at an interface of a client computing device 104, which can be a wearable computing device. The client computing device 104 can provide access to an instance of an automated assistant, which can interface with a document application for creating, sharing, and/or editing documents.

In response to receiving the first spoken utterance 106, the automated assistant can initialize execution of one or more functions in order to cause the document application to create a new document from a "report template." In some implementations, the automated assistant can use natural language understanding to identify and/or generate the one or more functions for execution. In some implementations, one or more trained machine learning models can be used when processing the first spoken utterance 106 and/or generating one or more functions to be executed by the document application. Such processing can include accessing data that has been recently accessed by the document application, with prior permission from the user 102. For example, historical data associated with the document application can indicate that the user 102 has previously identified another user with the name "Howard" when providing editing rights to certain documents created via the document application. In this way, the automated assistant can invoke a previously executed function, but swap one or more slot values of the function in order to satisfy any requests embodied in the first spoken utterance 106.

As a result of executing the one or more functions identified by the automated assistant, and in response to the first spoken utterance 106, the document application can create a new report and provide editing permissions to another user named "Howard." For example, the user "Howard" can be identified in a contact list that is stored in association with the user 102. Furthermore, the user 102 can provide a second spoken utterance 108 such as, "In the intro section, add a paragraph and a comment," and a third spoken utterance 110 such as, "The comment should say: 'This is where you should discuss the results.'" In response to receiving the second spoken utterance 108 and the third spoken utterance 110, the automated assistant can generate one or more additional functions to be executed by the document application. For example, in some implementations, because the user 102 has just used the automated assistant to perform document-related tasks, the automated assistant can select one or more automatic speech recognition (ASR) techniques that are adapted for understanding document-related queries.

In some implementations, an ASR technique that is selected can employ a particular trained machine learning model that is trained using document-related data and/or that is based on data associated with prior interactions between a user and a document application. In some additional or alternative implementations, an ASR technique that is selected can bias a particular trained machine learning model (e.g., a general model) toward recognition of term(s) that are often encountered in document-related queries. Biasing speech recognition toward certain term(s) can be accomplished utilizing one or more of various biasing techniques. As one example, a language model, utilized in some ASR techniques, can include weights for terms, where each of the weights reflect a corresponding degree of biasing for a corresponding term. As another example, biasing toward a term can be accomplished just by its inclusion in a language model utilized in ASR. As yet another example, a decoding graph, optionally utilized in ASR, can be decoded while biasing toward certain terms. As yet another example, biasing can be utilized to generate one or more additional hypotheses, that are in addition to an initial hypothesis (or initial hypotheses) generated by an ASR model, and those additional hypotheses considered as candidate transcriptions. For instance, an additional hypothesis can be generated and/or selected based on including biasing term(s). In these and other manners, any spoken utterances that are provided by the user 102 within a context of the first spoken utterance 106 can be more accurately interpreted by the automated assistant.

In response to the second spoken utterance 108, the automated assistant can generate a function that causes the document application to create a new paragraph in a section of the new report that was just created in response to the first spoken utterance 106. In some implementations, the report document that has been newly created can be associated with one or more semantic annotations that each include one or more corresponding semantic interpretations for a particular portion of the report document. This can be, in part, because the report document was created from template, which can include existing semantic annotations. However, in some implementations, when an automated assistant is requested to perform an operation associated with a particular document, the automated assistant can generate and/or access semantic annotations associated with the particular document. Such semantic annotations can allow the automated assistant to associate certain inputs from a user with certain portions of one or more documents that the user may have access to. For example, the report document created by the user 102 can include a semantic annotation that characterizes a paragraph in a second page of the report document as being an "introduction" (e.g., <Paragraph-3>}, ["introduction," "beginning," "opening"]). Therefore, because "intro," as mentioned in the second spoken utterance 108, is synonymous with "introduction," as described by the semantic annotation, the automated assistant can generate a function that causes the document application to create a new paragraph in the second page of the report document.

Furthermore, and as requested by the user 102 via the second spoken utterance 108, the automated assistant can generate another function that causes a comment to be correlated with the new paragraph created on the second page. The automated assistant can also generate yet another function per the third spoken utterance 110 to include the text, "This is where you should discuss the results" in the comment. When each generated function can be created and executed, the automated assistant can optionally provide an output 112 characterizing the progress of the requests from the user 102. For example, the output 112 can be audibly rendered via the client computing device 104 and include natural language content such as, "Ok, I've created the report and added the paragraph and the comment. I've also shared the report with Howard."

FIG. 1B illustrates a view 120 of a second user 126 responding to the automated assistant, which has provided a notification 128 indicating that the first user 102 has shared a document with them. In some implementations, the second user 126 can have a client computing device 124 that provides access to another instance of an automated assistant. The automated assistant that is associated with the second user 126 can be provided by the same entity, or a different entity, that provides access to the automated assistant that was accessed by the first user 102 in FIG. 1A. In some implementations, separate instances of automated assistants can communicate via an API and/or other interface for communicating between applications.

The notification 128 provided by the automated assistant via the client computing device 124 can include natural language content such as, "Katherine has shared a document with you." The natural language content of the notification 128 can optionally be audibly rendered for the second user 126 and/or a graphical notification 138 can be rendered at a GUI 136 of the client computing device 124. For example, in some implementations, when the first user 102 invokes an automated assistant to perform an action that is associated with a document that the second user 126 can access, the automated assistant can cause a graphical notification 138 to be rendered at the GUI 136. The graphical notification 138 can include a rendering of a portion 134 of the report created by the first user 102, and the particular portion 134 that is rendered can include a comment 132 that is directed to the second user 126. In some implementations, in order to generate the graphical notification 138, the automated assistant associated with the first user 102 and/or the second user 126 can request, via an API call or other request, that the document application provide certain data that is relevant to the second user 126. For example, an automated assistant can request that a subsection of an entirety of the document be provided by the document application in a form that is similar to a GUI that would be generated by the document application.

The document application can optionally provide a graphical rendering of the particular portion 134 of the document that corresponds to the comment 132, thereby allowing the second user 126 to visualize a context of the comment 132. In some implementations, the automated assistant associated with the second user 126 can request that the document application provide a rendering of the particular portion 134 of the document according to the type of interface(s) available via the client computing device 124. In some implementations, the request can be fulfilled when the document application provides an image file, textual data, audio data, video data, and/or any combination of data characterizing the particular portion 134 of the document. In this way, the second user 126 can receive an audible rendering of the comment 132 and/or any subsection of the document associated with comment 132 when a display interface is not currently available to the second user 126.

When the second user 126 has acknowledged comment 132 from the first user 102, the second user 126 can provide a responsive request to their respective automated assistant. For example, the second user 126 can provide a spoken utterance 130 such as, "Assistant, please add the following statement to that new paragraph: 'The results confirm our earliest predictions.'" In response, the automated assistant can generate one or more functions that, when executed, cause the document application to modify the portion of the report corresponding to the new paragraph to include the statement from the second user 126. In some implementations, the one or more functions can be generated more efficiently based on one or more previous interactions between the first user 102 and the automated assistant, and/or the second user 126 and the automated assistant. For example, the automated assistant can access data characterizing one or more interactions that have occurred in which the report document was the subject of the one or more interactions. Such data can be used by the automated assistant in order to identify slot values for one or more functions to be executed in order to fulfill a request from a user. For instance, in response to the spoken utterance 130, the automated assistant can determine whether any documents accessible to the second user 126 have recently been edited to include a new paragraph. When the report document is identified as being most recently edited to include a new paragraph, the automated assistant can invoke the document application to edit the new paragraph according to the spoken utterance 130 from the second user 126.

In some implementations, based on the edit made by the second user 126, the automated assistant can generate one or more additional semantic annotations that characterize one or more subsections of an entirety of the report document. For instance, an additional semantic annotation can characterize the edits made in FIG. 1B as "new paragraph by Howard; results." Thereafter, content of this semantic annotation can be used when selecting whether the report document and/or the subsection of the report document is the subject of another spoken utterance from the first user 102 or the second user 126. As an example, in FIG. 1C, the first user 102 can provide a spoken utterance 142 to an automated assistant that is accessible via a client computing device 146 that is a standalone speaker device. The spoken utterance 142 can be, for example, "Assistant, were anymore edits made by Howard?" The spoken utterance 142 can be provided by the first user 102 at a point in time that is subsequent to a period of time that includes the interactions described with respect to FIG. 1A and FIG. 1B.

In response to receiving the spoken utterance 142, the automated assistant can determine that the first user 102 referenced a contact, "Howard," and identify the report document. The automated assistant can identify the report based on the first user 102 having identified "Howard" in an interaction with the automated assistant when the first user 102 requested that the automated assistant create the report document. This can cause the automated assistant to rank and/or otherwise prioritize the report document over other documents that the automated assistant may access in order to fulfill one or more requests in the spoken utterance 142. When the automated assistant has identified the report document, the automated assistant can determine that the first user 102 is requesting that the automated assistant identify any recent changes made by the contact, "Howard." In response, the automated assistant can generate one or more functions for causing the document application to provide information regarding certain edits based on an identified author of the edits. For example, the one or more functions can include recent_edits("report document", "Howard", most_recent( )), which, when executed, can return a synopsis of one or more recent modifications made to an identified document (e.g., "report document"). For example, the synopsis can include a semantic understanding of an edit made to the report document and/or an indication of one or more types of edits made to the identified document (e.g., an addition of text).

As a result, and in response to the spoken utterance 142, the automated assistant can provide an output 148 such as, "Howard added text to the new paragraph." In some implementations, the automated assistant can generate semantic annotations for a document as the document is being edited. In this way, subsequent automated assistant inputs related to the document can be more readily fulfilled, while mitigating latency that can occur during document identification. For example, when the first user 102 provides another spoken utterance 150 such as, "Read the conclusion," the automated assistant can identify a semantic annotation characterizing a portion of the report document as having conclusory language—despite the report document not having the word "conclusion" in the content of the report document. Thereafter, the automated assistant can provide an audible output 152 via the client computing device 146 and/or a visual output at a television computing device 144. For example, the client computing device 146 can render the audible output "Sure . . . " followed by the automated assistant audibly rendering a paragraph of the report document corresponding to the conclusory semantic annotation.

FIG. 2A, FIG. 2B, FIG. 2C, and FIG. 2D illustrate a view 200, a view 220, a view 250, and a view 260 of a user 202 creating and editing a document using an automated assistant. The user 202 can initialize creation of a document, such as a spreadsheet, by first invoking the automated assistant to determine whether certain document sources are available to the automated assistant. For example, the user 202 can provide a first spoken utterance 206 such as, "Do I have any notes related to solar cells?" to an interface of a computing device in a vehicle 208, which can provide access to the automated assistant. In response, the automated assistant can perform one or more searches for documents that include and/or are associated with the term "solar cells." When the automated assistant identifies multiple different documents related to the terms identified by the user 202, the automated assistant can provide an output 204 such as, "Sure."

When the user 202 acknowledges the output 204 from the automated assistant, the user 202 can provide a second spoken utterance 214 such as, "Could you consolidate those notes into a spreadsheet and read it to me?" In response to receiving the second spoken utterance 214, the automated assistant can generate one or more functions to be executed by a document application in order to cause the document application to consolidate the identified documents into a single document. When the consolidated single document is created by the document application, the automated assistant can access the consolidated document in order to fulfill the latter user request for the automated assistant to read the consolidated document to the user 202. For example, the automated assistant can respond with another output 216 such as, "Ok . . . " and thereafter read the consolidated document (e.g., a new spreadsheet) to the user 202.

In some implementations, in order for the automated assistant to perform further operations with respect to the consolidated document, the automated assistant can cause semantic annotations to be stored in association with the consolidated document. For example, and as provided in FIG. 2B, the automated assistant can generate a request for semantic annotations to be associated with the consolidated document (e.g., spreadsheet 232). The request can be executed at the vehicle computing device and/or a remote computing device 222, such as a remote server device. In some implementations, one or more techniques for generating a semantic annotation for a particular subsection of a document can be employed. For instance, one or more trained machine learning models and/or one or more heuristic approaches can be utilized in order to generate semantic annotations for the spreadsheet 232. Data that is processed in order to generate a particular semantic annotation can include: content of the spreadsheet 232, interaction data characterizing interactions between the user 202 and the automated assistant, documents from which the spreadsheet 232 was based, and/or any other source of data that can be associated with the spreadsheet 232 and/or the automated assistant. For example, each of the respective semantic annotations (224, 226, 228, and 230) can be generated based on content of the spreadsheet 232 and/or various design documents that were used to create each corresponding row of the spreadsheet 232 (Design_1 238, Design_2 240, Design_3 242, and Design 244). Alternatively, or additionally, a semantic annotation 234 can be generated for the entire spreadsheet 232, in order to provide a semantic understanding that can be referenced when the automated assistant is attempting to fulfill subsequent automated assistant requests.

Figure 2A:
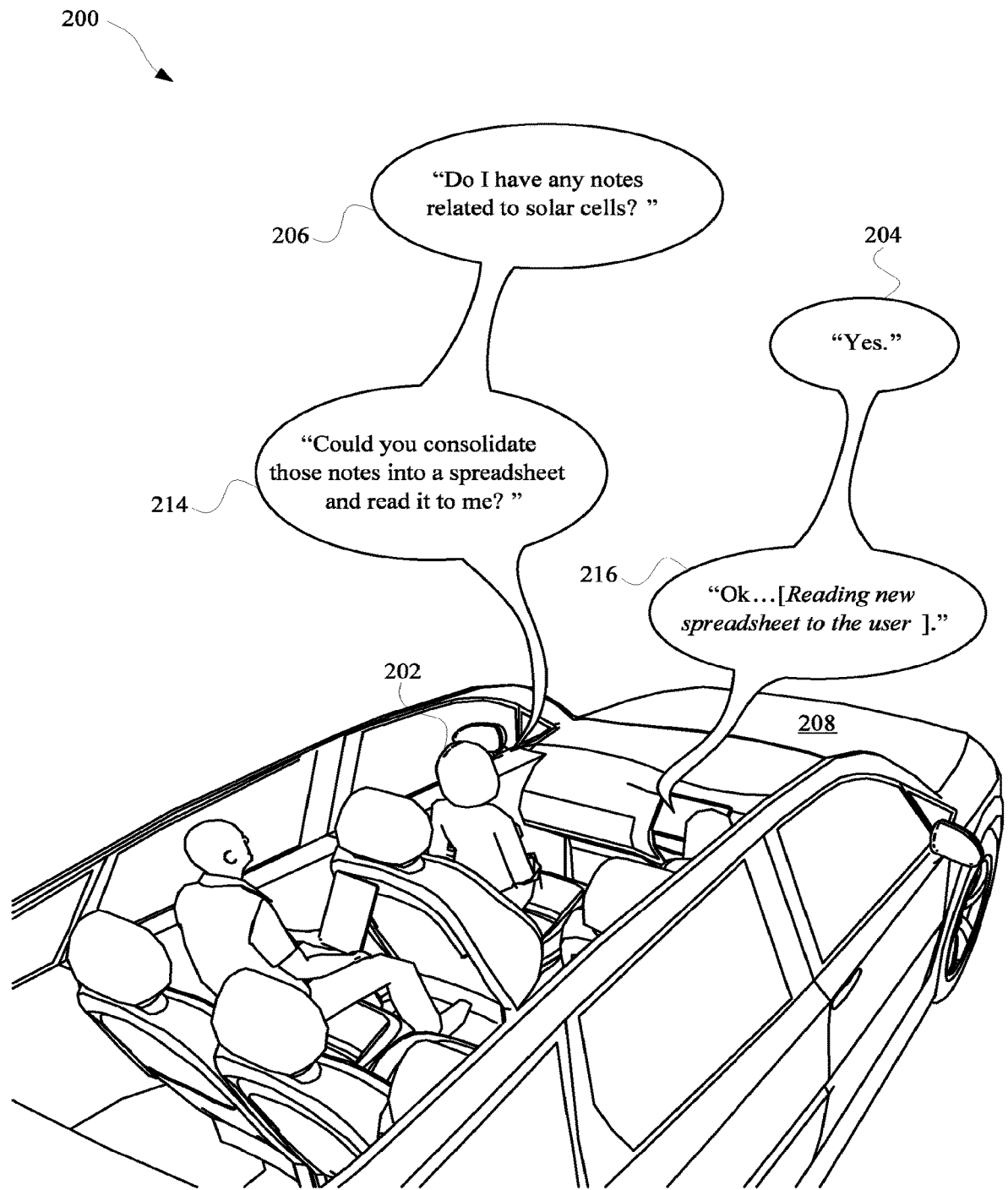
FIG. 2A, FIG. 2B, FIG. 2C, and FIG. 2D illustrate views of a user creating and editing a document using an automated assistant.
Figure 2B:
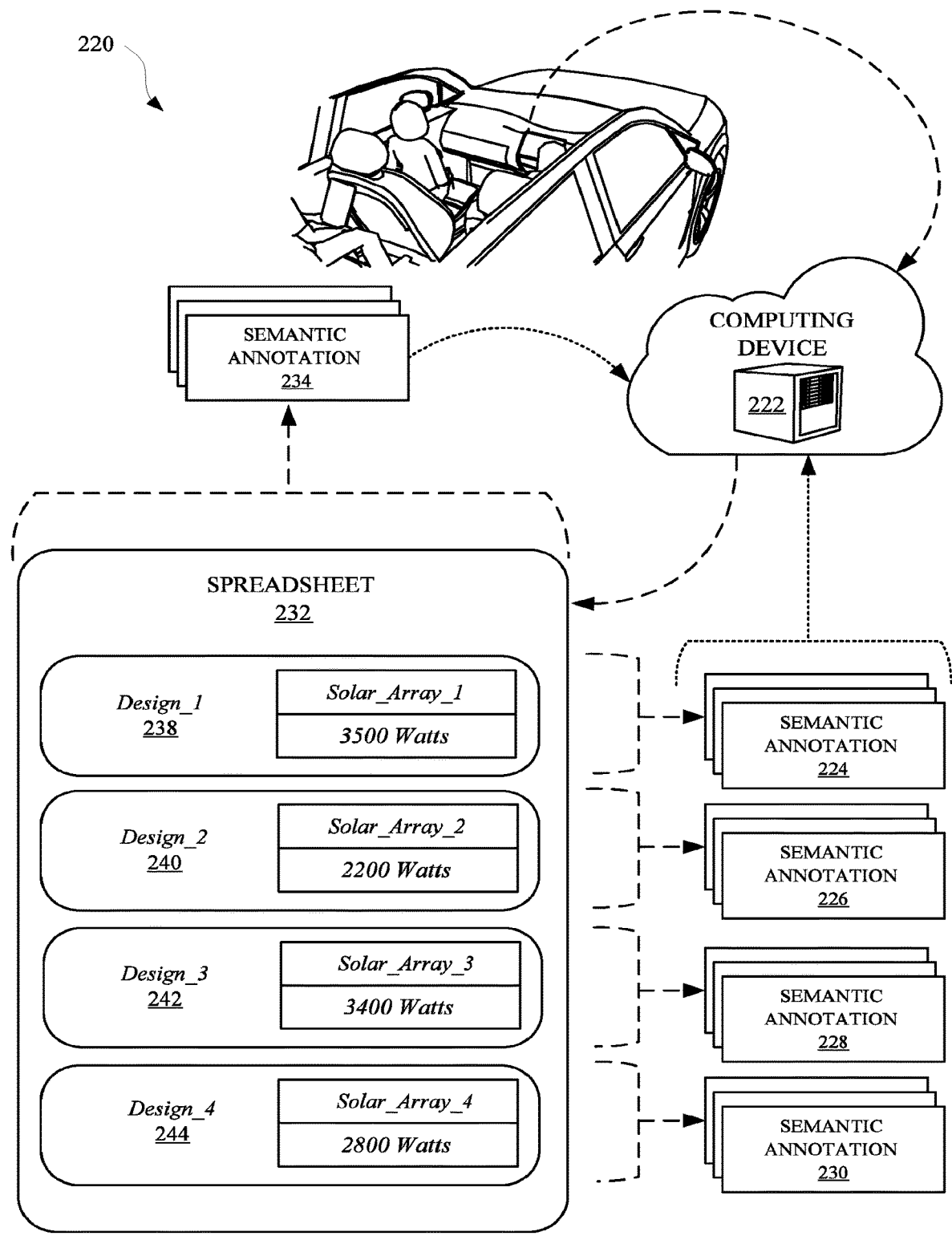
Figure 2C:
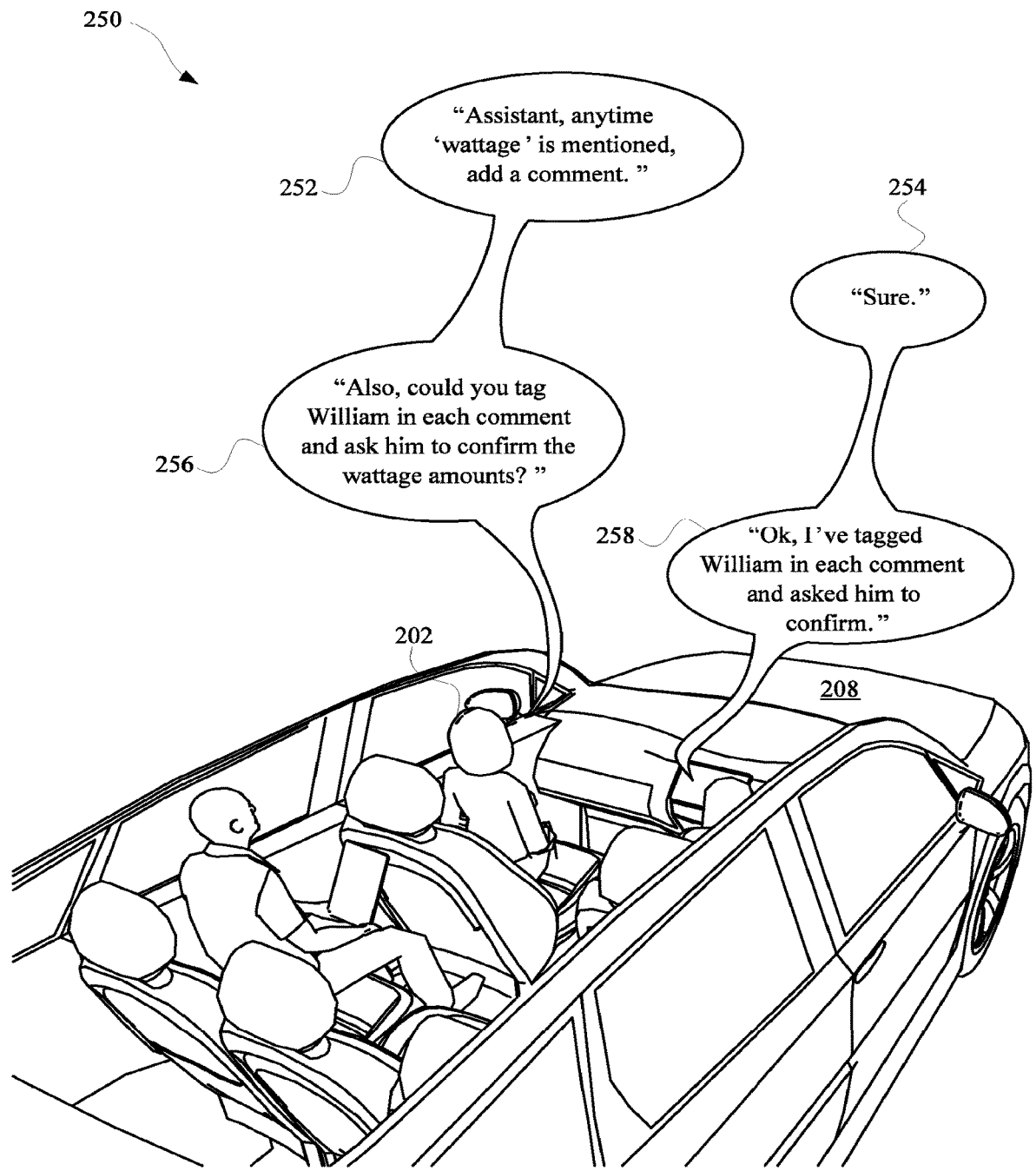
Figure 2D:
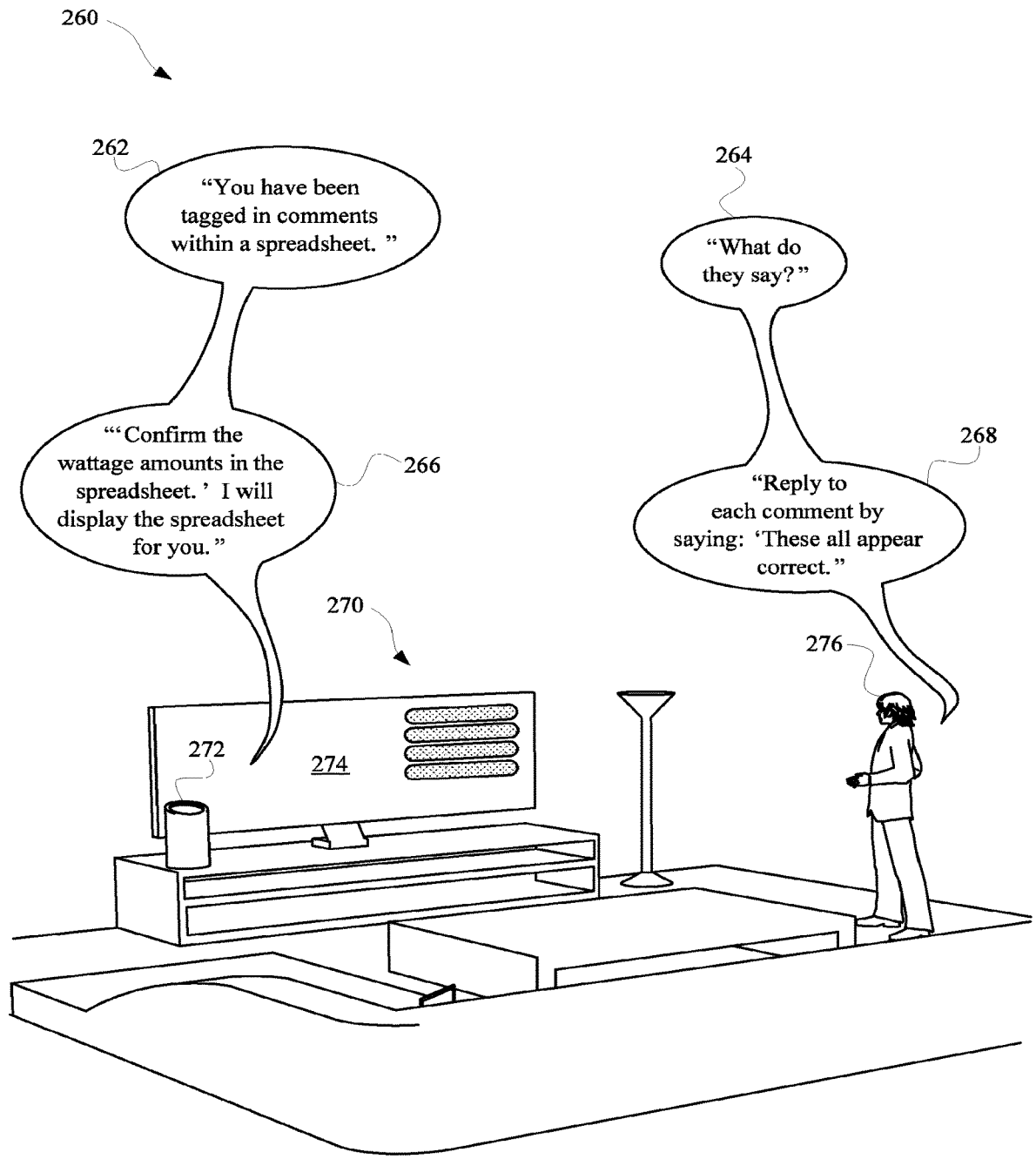

For example, as provided in FIG. 2C, the user 202 can provide another spoken utterance 252 such as, "Assistant, anytime wattage is mentioned, add a comment." In response, the automated assistant can generate one or more functions to be executed by a document application in order to fulfill the request from the user 202. When the document application executes the one or more functions, the document application and/or the automated assistant can identify instances of the term "wattage" in the spreadsheet 232 and correlate a respective comment with each instance of the term wattage. Upon completion, the document application can optionally invoke an API call to the automated assistant in order to cause the automated assistant to provide an indication 254 (e.g., "Sure.") that the requested action(s) has been fulfilled. Alternatively, or additionally, the indication 254 can be generated with a summary of recent edits such as: a number of edits performed across the document, a summary of changes that were made, a graphical indication of a latest version of the document, and/or any other information that can characterize changes to a document.

In some implementations, the user 202 can provide a spoken utterance 256 in order to cause the automated assistant to notify another user of changes that have been made to the spreadsheet 232. For instance, the spoken utterance 256 can be, "Also, could you tag William in each comment and ask him to confirm the wattage amounts?" In response, the automated assistant can generate one or more functions that, when executed, cause the document application to modify comments corresponding to the term "wattage," and also provide a message to a contact (e.g., "William") regarding each comment. In order to perform the aforementioned operations on the intended document, the automated assistant can identify one or more documents that have been recently accessed by the user 202 and/or the automated assistant. This can allow the automated assistant to identify the spreadsheet 232, which may have been most recently modified to include comments and/or certain semantic annotations.

For example, each respective semantic annotation (224, 226, 228, and 230) can be stored in association with a particular row in the spreadsheet 232, and each respective semantic annotation can include one or more terms synonymous with the unit of measure "Watts." For example, each respective semantic annotation can identify terms such as "wattage," "watts," "power," and/or any other term synonymous with "Watts." Therefore, in response to the spoken utterance 256, the automated assistant can identify the spreadsheet 232 as being most associated with "wattage amounts" and cause each wattage-related comment in the spreadsheet 232 to include a request for "William" to confirm any "wattage amounts." In response, the automated assistant can provide an output 258 such as, "Ok, I've tagged William in each comment and asked him to confirm."

In some implementations, a second user 276 (e.g., William) can interact with an instance of the automated assistant in order to further edit the spreadsheet 232. For example, an automated assistant that is accessible to the second user 276 can provide an output 262 via a client computing device 272. The output 262 can include natural language content such as, "You have been tagged in comments within a spreadsheet." In response, the second user 276 can provide a first spoken utterance 264 such as, "What did they say?" The automated assistant can process the first spoken utterance 264 and determine that the second user 276 is referring to the comments in the spreadsheet 232, and then access the text of the comments. The automated assistant can then cause the client computing device 272, or another computing device 270, such as a television, to render an output characterizing the text of the comments. For example, the automated assistant can cause the client computing device 272 to render another audible output 266 such as, "Confirm the wattage amounts in the spreadsheet," and also provide an indication that the spreadsheet 232 will be rendered at a nearby display interface 274 (e.g., "I will display the spreadsheet for you."). The automated assistant can then cause a display interface 274 to render a subsection of an entirety of the spreadsheet 232. The second user 276 can continue to edit the spreadsheet 232 via the document application by providing a second spoken utterance 268 such as, "Reply to each comment by saying: These all appear correct." In response, the automated assistant can generate one or more functions that, when executed, cause the document application to edit each spreadsheet comment that is directed to the second user 276 (e.g., William). In this way, the second user 276 is able to review and edit documents without requiring that their appendages be used to manually control certain peripherals of a dedicated document-editing device.

Figure 3:
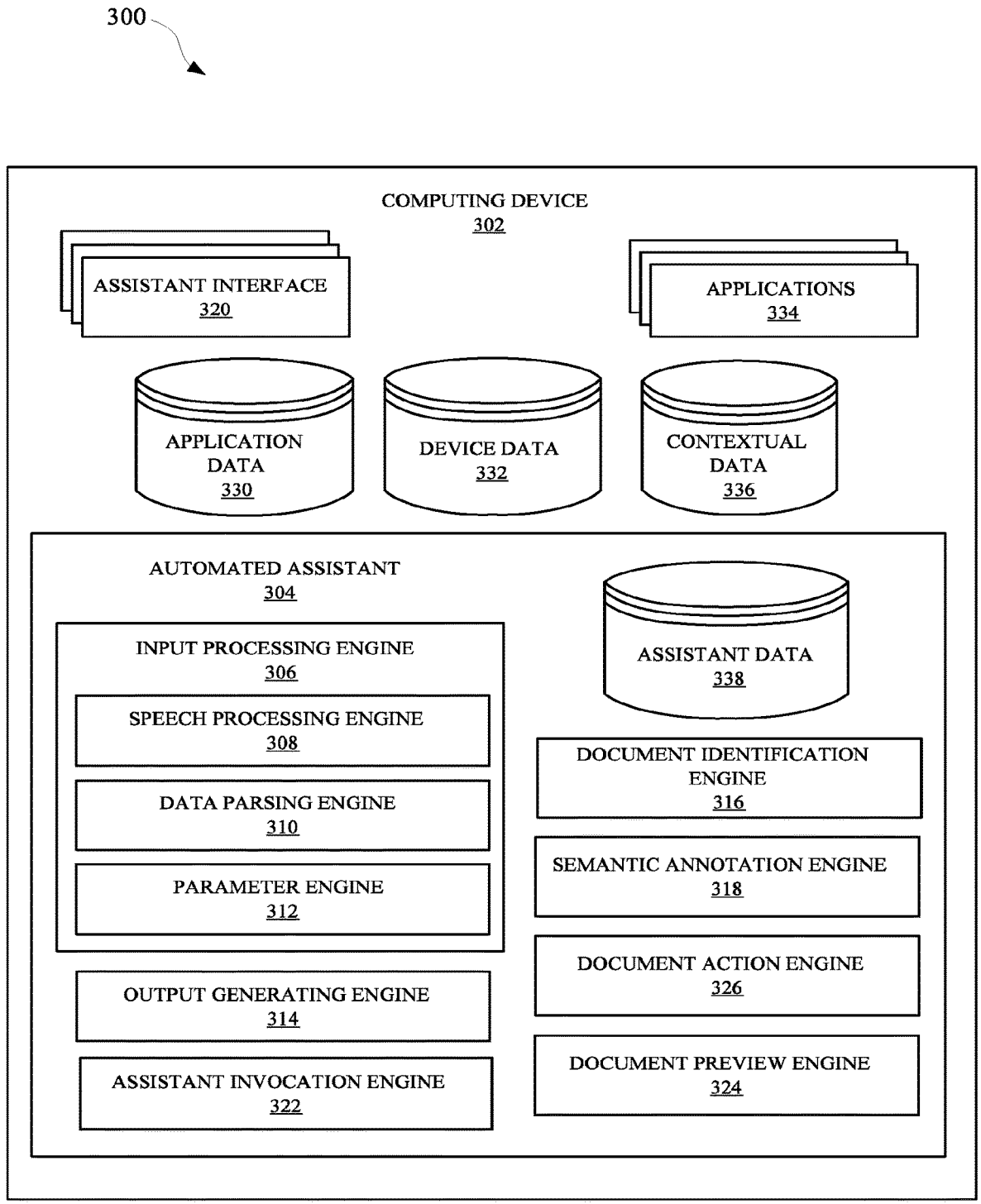
FIG. 3 illustrates a system for providing an automated assistant that can edit, share, and/or create various types of documents in response to user input(s).

FIG. 3 illustrates a system 300 for providing an automated assistant 304 that can edit, share, and/or create various types of documents in response to user input(s). The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, gestural, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334, which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include a document identification engine 316 that can identify one or more documents that a user may be requesting that the automated assistant 304 access, modify, edit, and/or share. The document identification engine 316 can be used when processing natural language content of a user input, such as a spoken utterance. Based on such processing, the document identification engine 316 can determine a score and/or probability for one or more documents that are accessible to the automated assistant 304. A particular document with a highest score and/or highest probability can then be identified as the document that the user is referring to. In some instances, when two or more documents have a similar score and/or probability, the user can be prompted to clarify the document they are referring to, and the prompt can optionally features of the two or more documents (e.g. title, contents, collaborators, recent edits, etc. from documents having certain scores). In some implementations, factors that influence whether a particular document is identified by the document identification engine 316 can include: a context of a user input, previous user inputs, whether the user input identifies another user, a schedule of the user, whether the content of the user input is similar to content of one or more semantic annotations, and/or any other factors that can be associated with a document.

In some implementations, the system 300 can include a semantic annotation engine 318, which can be used to generate and/or identify semantic annotations for one or more documents. For example, when the automated assistant 304 receives an indication that someone is sharing a document with an authenticated user of the automated assistant 304, the semantic annotation engine 318 can be employed to generate semantic annotations for the document. The semantic annotations can include natural language content and/or other data that provides an interpretation of one or more subsections of an entirety of the document. In this way, the automated assistant 304 can rely on the semantic annotations for a variety of different documents when determining that a particular document is the subject of a request from a user.

In some implementations, a semantic annotation for a particular document can be generated based on how one or more users refer to the particular document. For example, a particular document can include semantic annotations as well as other content in a body of the document. Although the content of the document and the semantic annotations can include various descriptive language, the content of the document may not include any terms that the user tends to use when referencing the document. For example, a user can refer to a particular spreadsheet as a "home maintenance" spreadsheet even though the particular spreadsheet does not include the term "home" or "maintenance. However, based on the automated assistant 304 receiving a user input referring to the "home maintenance" spreadsheet, and the automated assistant 304 identifying the "home maintenance" spreadsheet using the document identification engine 316, the semantic annotation engine 318 can generate a semantic annotation. The semantic annotation can incorporate the term "home maintenance" and can be stored in association with the "home maintenance" spreadsheet. In this way, the automated assistant 304 can preserve processing bandwidth when identifying documents that a user may be referring to. Additionally, this can allow for document editing via the automated assistant 304 to be performed more efficiently, as the automated assistant 304 can adapt to the dynamic perspectives users may have with respect to certain documents.

In some implementations, the system 300 can include a document action engine 326, which can identify one or more actions to be performed with respect to a particular document. The document action engine 326 can identify one or more actions to be performed based on a user input, past interaction data, application data 330, device data 332, contextual data 336, and/or any other data that can be stored in association with a document. In some implementations, one or more semantic annotations associated with one or more documents can be used to identify a particular action that a user is requesting the automated assistant 304 to perform. Alternatively, or additionally, the document action engine 326 can identify one or more actions to perform for a particular document based on content of the particular document and/or content of one or more other documents.

For example, a user can provide an input such as, "Assistant, add a new 'Date' row to my finance spreadsheet." In response, the document action engine 326 can determine that the user is associated with a "finance" spreadsheet that includes various dates listed down a column, and can then determine that a suitable action to be performed includes executing a new_row( ) function and an insert_date( ). In this way, a new row can be added to the "finance" spreadsheet, and a current date entry can be added to the new row. In some implementations, selection of the functions to be executed can be based on processing of the user input and/or other contextual data using one or more trained machine learning models and/or one or more heuristic processes. For instance, a particular trained machine learning model can be trained using training data that is based on instances in which another user requested that their respective automated assistant perform a particular operation, but then the other user manually performed the particular operation. This training data can therefore be derived from crowd-sourcing techniques for teaching an automated assistant to accurately respond to requests from various users that are directing their automated assistant to perform operations associated with a particular document.

In some implementations, the system 300 can include a document preview engine 324, which can process data associated with one or more documents in order to allow the automated assistant 304 to provide a suitable preview of a particular document. For example, a first user causes an automated assistant to edit a particular document and then share the particular document with a second user. In response, an instance of the automated assistant associated with the second user can employ the document preview engine 324 to render a preview of the particular document—without necessarily causing a document application to occupy an entire display interface of a computing device. For example, the automated assistant can employ an API in order to retrieve graphical preview data from a document application and then render a graphical notification for the second user based on the graphical preview data. Alternatively, or additionally, the automated assistant can include functionality for rendering a portion of a document that has been edited by a user without necessarily rendering the entire document. For instance, a user can provide a spoken utterance such as, "Assistant, what is the latest slide added to my architecture presentation?" In response, the automated assistant 304 can invoke the document identification engine 316 to identify the "architecture" presentation document, and also invoke the document preview engine 324 to capture a preview (e.g., image(s) and/or text) of a slide that was most recently added to the document. The automated assistant 304 can then cause a display interface of the computing device 302 to render a graphic of a most recently added slide, without causing an entire presentation application to be loaded into a memory of the computing device 302. Thereafter, the user can view the slide preview and provide another command to the automated assistant 304 for editing the slide and/or adding a comment to the slide (e.g., "Assistant, add a comment to this slide and tag William in the comment.").

Figure 4:
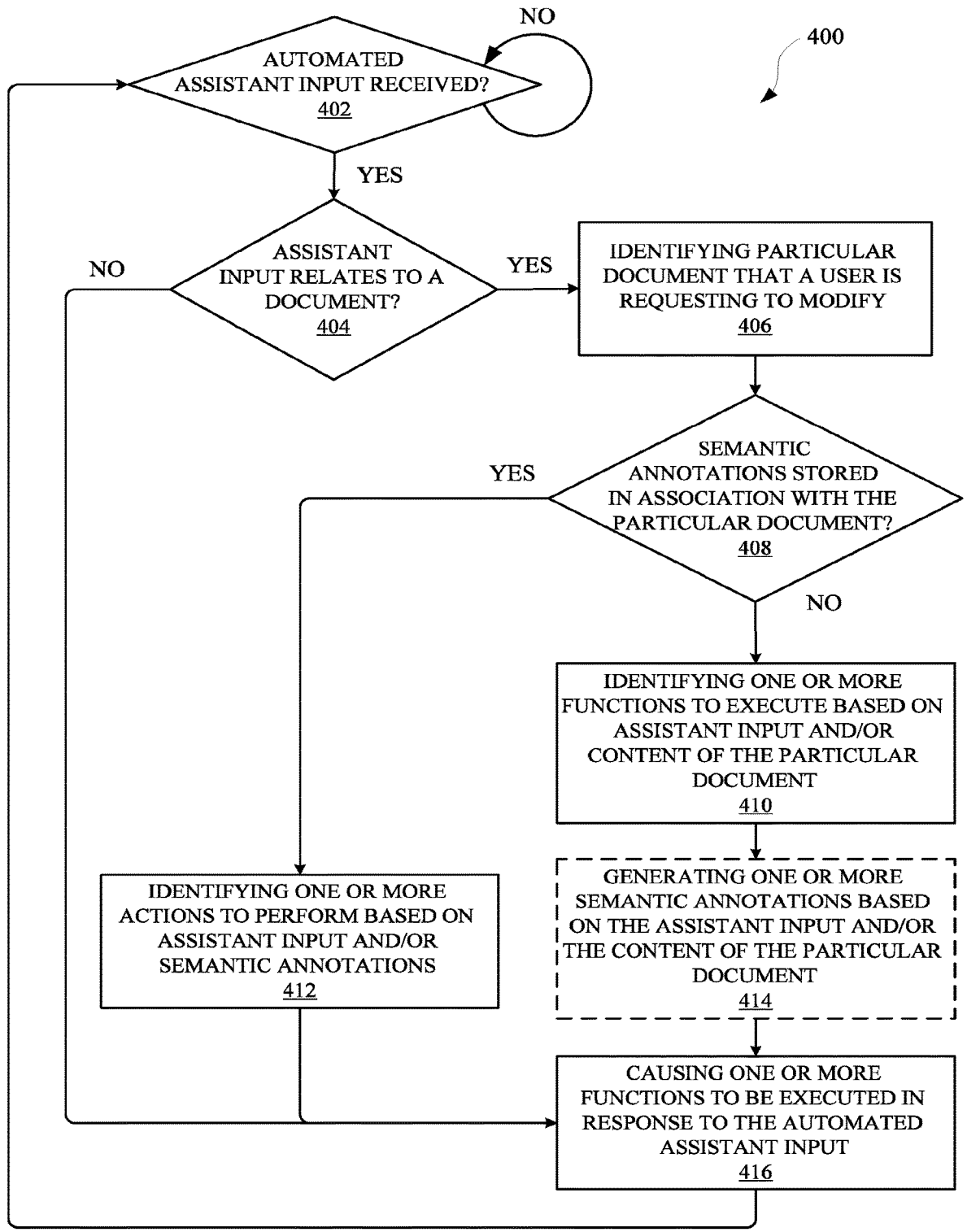
FIG. 4 illustrates a method for causing an automated assistant to interact with a document application in order to edit a document without necessitating that a user directly interact with an interface of the document application.

FIG. 4 illustrates a method 400 for causing an automated assistant to interact with a document application in order to edit a document without necessitating that a user directly interact with an interface that is dedicated to the document application. The method 400 can be performed by one or more computing devices, applications, and/or any other apparatus or module that can be associated with an automated assistant. The method 400 can include an operation 402 of determining whether an automated assistant input has been received by the automated assistant. The automated assistant input can be a spoken utterance, input gesture, textual input, and/or any other input that can be used to control an automated assistant. The method 400 can proceed from the operation 402 to an operation 404 when an automated assistant input is received. Otherwise, the automated assistant can proceed to an operation 416 for causing one or more other functions to be executed in response to the automated assistant input.

The operation 404 can include determining whether the automated assistant input relates to a particular document, such as a document that can be accessed via a document application. In some implementations, the document application can be an application that is installed at a client computing device and/or is accessible via a browser or other web application. Alternatively, or additionally, the document application can be provided by an entity that is the same or different from an entity that provides the automated assistant. When the automated assistant determines that the automated assistant input relates to a document, the method 400 can proceed to an operation 406. Otherwise, the automated assistant can perform one or more operations in furtherance of fulfilling any request embodied in the automated assistant input and return to the operation 402.

The operation 406 can include identifying a particular document that a user is requesting to modify. In some implementations, the particular document can be identified using interaction data that characterizes one or more prior interactions between the user and the automated assistant. Alternatively, or additionally, the automated assistant can access application data associated with one or more document-related applications in order to identify one or more documents that may be related to the automated assistant input. For example, the automated assistant can generate one or more functions that, when executed by a respective document application, can cause the document application to return a list of recently accessed documents. The automated assistant can optionally, and with prior permission from the user, access one or more of the listed documents in order to determine whether a particular document of the one or more listed documents is the document that the user is referring to. The automated assistant and/or another application can generate and/or identify semantic annotations associated with each of the listed documents, and the semantic annotations can be used to determine whether the automated assistant input relates to content of a particular listed document. For example, when terms included in a particular semantic annotation for a particular document are the same as, or synonymous with, terms included in the automated assistant input, that particular document can be prioritized over other less-relevant documents when selecting the document that will be subject to the automated assistant input.

In some implementations, the method 400 can proceed from the operation 406 to an operation 408, which can include determining whether any semantic annotations are already stored in association with the particular document. When the semantic annotations are not stored in association with the particular document, the method 400 can proceed to an operation 410. However, when semantic annotations are stored in association with the particular document, the method 400 can proceed to an operation 412. The operation 412 can include identifying one or more functions to execute based on the automated assistant input and/or semantic annotations. For example, when the automated assistant input refers to a subsection of the particular document, a semantic annotation corresponding to that subsection can include terms that are synonymous with the automated assistant input. For instance, when the automated assistant input includes a request to add a comment to a "statistical data" section of the particular document, but the particular document does not have a subsection that is expressly labeled "statistical data," the automated assistant can identify statistical terms in one or more semantic annotations. Terms such as "average" and "distribution" can be included in a particular semantic annotation for a particular subsection, thereby providing the automated assistant with a correlation between the particular subsection and the automated assistant input. As a result, the automated assistant can generate a function that is directed to the particular subsection of the particular document. The function can include a slot value or other parameter that identifies a portion of text in the particular subject via a word number, line reference, paragraph number, page number, and/or any other identifier that can be used to identify a subsection of a document. The method 400 can proceed from the operation 412 to an operation 416, which can include causing one or more functions to be executed in response to the automated assistant input.

When semantic annotations are not currently stored in association with the particular document, the method 400 can proceed from the operation 408 to an operation 410. The operation 410 can include identifying one or more functions (i.e., actions) to execute based on the automated assistant input and/or content of the particular document. The method 400 can include an optional operation 414 of generating one or more semantic annotations based on the automated assistant input and/or the content of the particular document. For example, when the user uses one or more terms to refer to a particular subsection of the particular document, the automated assistant can generate a semantic annotation that includes the one or more terms. The generated semantic annotation can then be stored as metadata in association with the particular document, and—in particular, in association with the particular subsection of the particular document. The method 400 can proceed from the operation 410 and/or the operation 414 to the operation 416, in which the one or more functions are executed in response to the automated assistant input from the user.

Figure 5:
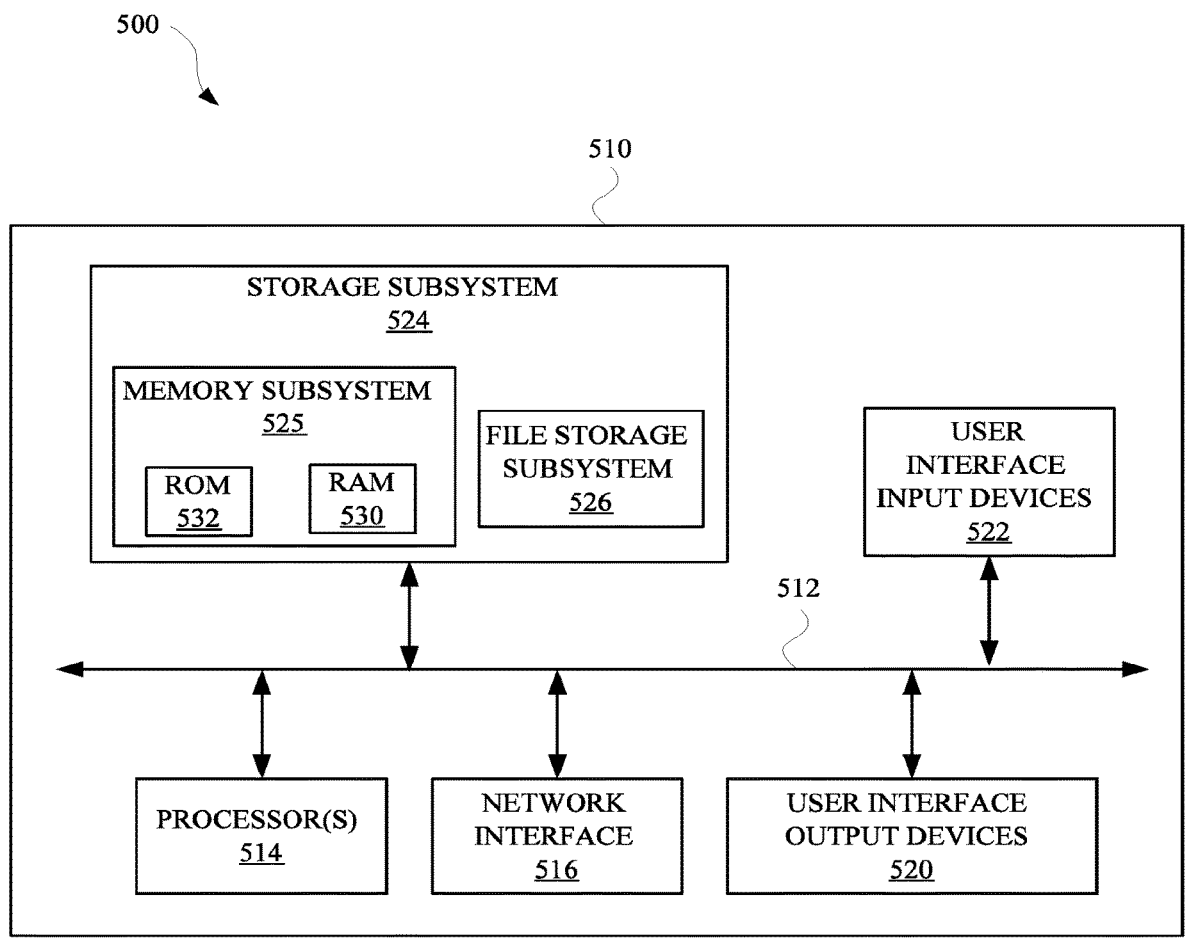
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, client computing device 104, client computing device 124, client computing device 146, vehicle 208, computing device 222, client computing device 264, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at an automated assistant interface of a computing device, a user input that is directed to an automated assistant from a user, wherein the user input includes a request for the automated assistant to access or modify a document. The method can further include an operation of identifying, in response to receiving the user input, a particular document that the user is requesting to access or modify, wherein the particular document is stored at the computing device or another computing device, wherein an express recitation of a corresponding name of the particular document is omitted from the user input, and wherein identifying the particular document includes processing data that includes natural language content of the user input and content of each document of multiple different documents that are accessible via the computing device. The method can further include an operation of determining one or more actions to perform on the particular document, wherein determining the one or more actions is based on the user input and one or more semantic annotations of the particular document that are stored in association with the particular document, and wherein each semantic annotation of the one or more semantic annotations includes a semantic interpretation of a respective subsection of an entirety of the particular document. The method can further include an operation of causing the one or more actions to be performed to access or modify the particular document in accordance with the user input.

In some implementations, the particular document was not originally created by the user, and the particular document was created using a document application that is different from the automated assistant. In some implementations, the data further includes additional semantic annotations, and each additional semantic annotation of the additional semantic annotations includes another semantic interpretation of another respective subsection of a respective additional document of the multiple different documents. In some implementations, the automated assistant interface of the computing device includes a microphone, and the user input is received when a document editing program, which is used to edit the particular document, is absent from a foreground of a graphical user interface of the computing device. In some implementations, the one or more semantic annotations comprises a particular semantic annotation that includes the semantic interpretation of a document comment that was created by an additional user, and the one or more actions include causing a notification to be provided to the additional user via another interface of a separate computing device that is associated with the additional user.

In some implementations, the method can further include an operation of, prior to receiving the user input at the automated assistant interface of the computing device: receiving another user input that includes another request for the automated assistant to render a description of supplemental content that was added to the particular document by another user. In some implementations, the request provided via the user input directs the automated assistant to access or modify the supplemental content that was added to the particular document by the other user. In some implementations, causing the one or more actions to be performed includes: performing speech to text processing to convert a portion of the user input to textual data, and causing the textual data to be incorporated into a part of the particular document corresponding to a particular semantic annotation of the one or more semantic annotations. In some implementations, the method can further include an operation of generating the one or more semantic annotations using a trained machine learning model that is trained using training data that is based on previous user interactions between the user and other portions of the various different documents.

In other implementations, a method implemented by one or more processors is forth as including operations such as receiving, at an automated assistant interface of a computing device, a request corresponding to a spoken utterance from a user, wherein the computing device provides access to an automated assistant. The method can further include an operation of identifying, based on the request, natural language content from a portion of a particular document, wherein the portion of the particular document is absent from a foreground of a graphical user interface of the computing device when the user provided the spoken utterance. The method can further include an operation of determining, based on the natural language content from the portion of the particular document, one or more particular actions that the user is requesting that the automated assistant to perform. The method can further include an operation of causing, based on the request, performance of an action of the one or more actions to be initialized.

In some implementations, causing performance of the action includes: causing the automated assistant to audibly render natural language content from the portion of the particular document. In some implementations, the method can further include an operation of, subsequent to initializing performance of the action of the one or more actions: receiving, at the automated assistant interface of the computing device, an additional request corresponding to an additional spoken utterance from the user, and determining, based on the additional spoken utterance and the natural language content from the portion of the particular document, that the user is requesting that the automated assistant edit the portion of the particular document. In some implementations, the method can further include an operation of, subsequent to initializing performance of the action of the one or more actions: receiving, at the automated assistant interface of the computing device, an additional request corresponding to an additional spoken utterance from the user, and determining, based on the additional spoken utterance and the natural language content from the portion of the particular document, that the user is requesting that the automated assistant communicate with another user. In some implementations, the other user added the natural language content to the particular document prior to the user providing the additional request.

In yet other implementations, a method implemented by one or more processors is set forth as receiving, at an application, a request from an automated assistant, wherein the request is provided by the automated assistant in response to a first user providing a user input to the automated assistant via a first computing device, and wherein the automated assistant is responsive to natural language input provided by the first user to an interface of the first computing device. The method can further include an operation of modifying, by the application, a document in response to receiving the request from the automated assistant, wherein the document is editable by the first user via the first computing device and a second user via a second computing device that is different from the first computing device. The method can further include an operation of generating, based on modifying the document, notification data that indicates the document has been modified by the first user. The method can further include an operation of causing, using the notification data, an additional automated assistant to render a notification for the second user via the second computing device, wherein the additional automated assistant is responsive to other natural language input provided by the second user to a separate interface of the second computing device.

In some implementations, the request includes a description of a subsection of the document, and modifying the document includes: comparing the description to multiple different semantic annotations that are stored in association with the document. In some implementations, comparing the description to multiple different semantic annotations that are stored in association with the document includes: assigning a similarity score to each semantic annotation of the multiple different semantic annotations, wherein a particular similarity score for a respective semantic annotation indicates a degree of similarity between the respective semantic annotation and the description. In some implementations, causing the additional automated assistant to render the notification for the second user includes: causing a graphical rendering of a subsection of the document to be rendered at the separate interface of the second computing device. In some implementations, the application is provided by an entity that is different from one or more other entities that provided the automated assistant and the additional automated assistant. In some implementations, the automated assistant and the additional automated assistant communicate with the application via an application programming interface.

We claim:

1. A method implemented by one or more processors, the method comprising:
    receiving, at an automated assistant interface of a computing device, a user input that is directed to an automated assistant,
        wherein the user input includes a natural language request for the automated assistant to modify a document;
    identifying, in response to receiving the user input, a particular document that the user is requesting to modify,
        wherein an express recitation of a corresponding name of the particular document is omitted from the user input, and
        wherein identifying the particular document includes processing data that includes the natural language request of the user input;
    determining, based on identifying the particular document that the user is requesting to modify, an application, the application being different than the automated assistant and providing access to the particular document;
    generating, subsequent to determining the application, based on determining the application and based on the natural language request, a function of the application, wherein generating the function of the application comprises:
        causing the application that is different than the automated assistant application to execute an initial function of the application to identify a value for a parameter that is required by the function; and
        generating the function to include the value for the parameter that is required by the function and that is identified by executing the initial function;
    causing the application to execute the generated function,
        wherein executing the generated function causes one or more actions, that correspond to the natural language request, to be performed on the particular document, wherein the one or more actions performed on the particular document cause modification of the particular document, and
    determining, based on identifying the particular document that the user is requesting to modify, a different application, the different application also being different than the automated assistant and also providing access to the particular document;
    generating, subsequent to determining the different application, based on determining the different application and based on the natural language request, a different function of the different application; and
    causing the different application to execute the generated different function of the different application,
        wherein executing the generated different function of the different application causes one or more different actions, that correspond to the natural language request, to be performed on the particular document.

2. The method of claim 1, wherein the particular document was not originally created by the user and the particular document was created using the application.

3. The method of claim 1, wherein generating the function is based on performing natural language understanding on the natural language request.

4. The method of claim 1, wherein the automated assistant interface of the computing device includes a microphone and the user input is received when the application and the particular document are absent from a foreground of a graphical user interface of the computing device.

5. The method of claim 1, wherein generating the function is based on processing the natural language request using one or more trained machine learning models.

6. The method of claim 1, wherein generating the function is based on the natural language request and a semantic annotation, of the particular document, that is stored as part of metadata of the particular document and that is a semantic interpretation of a subsection of the particular document.

7. The method of claim 6, wherein the semantic annotation is stored as the part of the metadata of the particular document based on a previous interaction, of the user and via the automated assistant, with the particular document.

8. The method of claim 1, wherein generating the function of the application is further based on identification of the particular document.

9. A method implemented by one or more processors, the method comprising:
    receiving, at an automated assistant interface of a computing device, a spoken utterance that is directed to an automated assistant,
        wherein the spoken utterance requests that the automated assistant modify a document, but omits any express recitation of a corresponding name of the document;
    selecting, based on a first portion of the spoken utterance and from a plurality of candidate documents, a particular document to modify;
    determining, based on a second portion of the spoken utterance and based on content of the selected particular document, a determined particular portion, of the particular document, to modify;
    determining, based on selecting the particular document to modify, an application, the application being different than the automated assistant and providing access to the particular document;
    generating, subsequent to determining the application, based on determining the application, based on a third portion of the spoken utterance, and based on the determined particular portion, one or more functions of the application that, when executed, cause the determined particular portion of the particular document to be modified, wherein generating one or more of the functions of the application comprises:

causing the application that is different than the automated assistant to execute an initial function of the application to identify a value for a parameter that is required by the function; and generating the function to include the value for the parameter that is required by the function and that is identified by executing the initial function;

causing one or more of the functions to be executed to modify the determined particular portion of the particular document;

determining, based on selecting the particular document to modify, a different application, the different application also being different than the automated assistant and also providing access to the particular document;

generating, subsequent to determining the different application, based on determining the different application, based on the third portion of the spoken utterance, and based on the determined particular portion, one or more different functions of the different application that, when executed, cause the determined particular portion of the particular document to be modified; and causing one or more of the different functions of the different application to be executed to modify the determined particular portion of the particular document.

10. The method of claim 9, wherein the particular document is stored at a remote computing device that is remote from the computing device.

11. The method of claim 9, wherein the spoken utterance is received when a document editing program, which is used to edit the particular document, is absent from a foreground of a graphical user interface of the computing device.

12. The method of claim 9, wherein the computing device lacks any display screen.

13. The method of claim 9, wherein selecting the particular document to modify is further based a semantic annotation, of the particular document, that is stored as part of metadata of the particular document.

14. The method of claim 13, wherein selecting the particular document to modify further comprises:

identifying the plurality of candidate documents, from which the selecting is performed, based on recency of access of the plurality of candidate documents.

15. The method of claim 13, wherein selecting the particular document to modify further comprises:

identifying the plurality of candidate documents, from which the selecting is performed, based on recency of modification of the plurality of candidate documents.

16. The method of claim 9, wherein selecting the particular document to modify further comprises:

identifying the plurality of candidate documents, from which the selecting is performed, based on recency of access of the plurality of candidate documents.

17. The method of claim 9, wherein selecting the particular document to modify further comprises:

identifying the plurality of candidate documents, from which the selecting is performed, based on recency of modification of the plurality of candidate documents.

18. The method of claim 9, wherein generating the function is further based on one or more prior interactions between the user and the particular document.

* * * * *